United States Patent Office 3,472,151
Patented Oct. 14, 1969

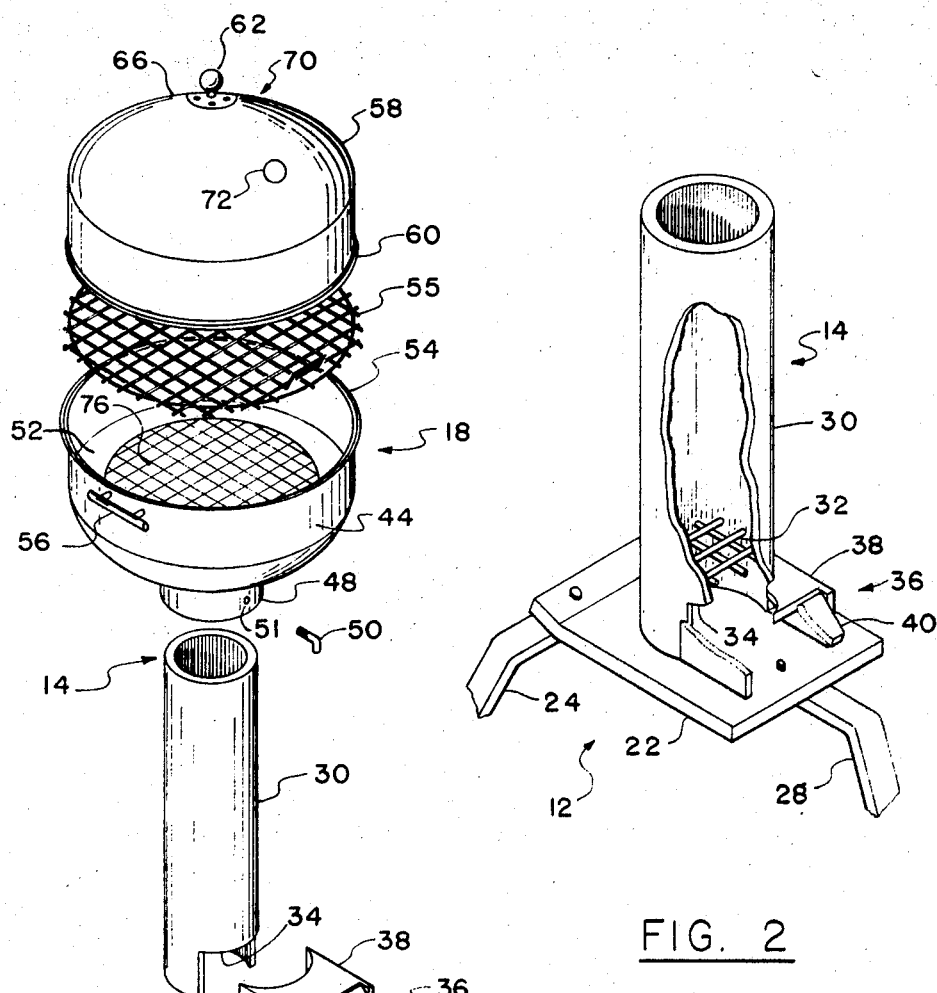
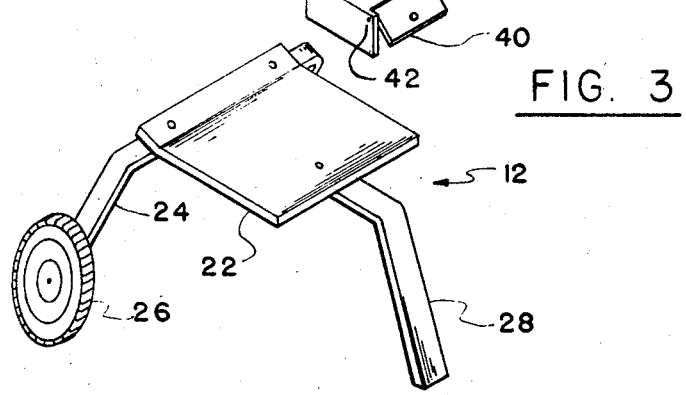
FIG. 2
FIG. 3

3,472,151
FOOD TREATMENT AND PREPARATION APPARATUS
Smythe R. Cox, 27791 Miami Ave.,
Hayward, Calif. 94545
Filed Aug. 21, 1967, Ser. No. 661,944
Int. Cl. A23b 1/04
U.S. Cl. 99—259      7 Claims

ABSTRACT OF THE DISCLOSURE

Apparatus for preparing food including a food supporting, sealable enclosure which is supported upon, in communication with, a vertically disposed hollow tube adapted to retain therein a column of wood chips. Draft control means is provided to cause the chips to smolder rather than burn, thereby enveloping the food supported in the enclosure in a dense smoke. The apparatus also may be quickly adapted to allow conventional barbequing.

BACKGROUND OF THE INVENTION

There are many types and varieties of braziers, grills, broilers and barbeque pits of portable, semiportable and/or permanent construction which are presently available. Typical among these are the circular and rectangular portable barbeque pits found in use in many homes. Such barbeque pits provide a grill, or similar means, for supporting food in a selected position above a bed of hot coals or wood chips, whereby the food is prepared by broiling. The barbeque pits in addition are sometimes provided with various hoods and/or enclosures integrally formed as part of the construction, which are adapted to maintain the food placed therein in a heated atmosphere to bake, broil or simply keep the food warm.

In addition there are presently on the market charcoal braziers which comprise a large bowl supported on legs and provided with a vertically movable grill, and a lid which fits upon the bowl to provide a snug, generally sealed fit. A fire is made in the bowl, the lid is sealed upon the bowl and a given amount of smoke is produced along with a much larger amount of heat. The food is thus prepared with a slight smoky taste, but is still primarily broiled due to the heat generated. However, simultaneously with the generation of heat, the coal or chips burn at the usual rate of open barbeques, consuming accordingly the usual quantity of fuel while producing a minor amount of smoke.

In the conventional barbeque pits charcoal briquets are generally used to provide heat, but it is possible to place wood chips soaked in water on the burning briquets to obtain smoke which envelopes the food to impart thereto a slightly smoky flavor. It has been found that many people enjoy this decided hickory smoke taste, particularly in meats and fish.

Along with the development of the outdoor barbeque, the barbequed foods and the family outdoor chef, there is a decided interest, and in fact preference, of various "outdoor minded" people for truly smoked foods. Not simply barbequed foods with a smoky flavor, but for foods prepared by a true smoking process such as practiced, for example, in the outdoor smoke houses of past years. These smoke houses were used, and are still used on some country places, to prepare hams, bacons, sausages and other meats and foods. Under the present living conditions of non-urban families it is not possible to have an old fashioned outdoor smoke house.

There are available various smokers of rather elaborate design and correspondingly high cost, which are designed primarily for commercial smoking companies. No smoker suitable for casual home use is presently available.

Thus, the only convenient way for the average person or family to obtain truly smoked foods is to purchase them from a grocery store or delicatessen. However, such smoked foods are generally very expensive.

SUMMARY OF THE INVENTION

The present invention provides apparatus for preparing food by smoking or by conventional barbequing, comprising a sealable enclosure including a grill therein for supporting food, a hollow tube detachably secured to the bottom of the enclosure in register with an opening therein, whereby the volume within the enclosure is in communication with that of the hollow tube, a platform upon which the hollow tube is supported, and a damper device coupled to the bottom end of the hollow tube to regulate the draft through the tube and thus the burning rate of the fuel placed in the tube. Thus the invention provides apparatus which, in its preferred embodiment, produces predominantly smoke and but a minor amount of heat, whereby the food is prepared by a true smoking process, not by broiling. The smoking action is provided by means of the hollow tube, which is generally sealed from the outside atmosphere and which is filled with a column of wood chips, of for example, hickory wood, and by setting the lowermost chips on fire. Regulating the introduction of air to the column of burning chips by means of the damper device, causes the chips to smolder rather than burn. This produces a dense smoke which is directed by the tube into the enclosure to envelope the food. Since the wood chips smolder rather than burn, a relatively smaller amount of fuel is consumed, thereby providing a relatively long period of smoking before refueling becomes necessary.

Accordingly, the present invention provides a relatively simple, portable apparatus for preparing food by a smoking process or by a conventional barbeque process, wherein the cost of the apparatus is comparable with that of conventional barbeque pits and which is thus within the budget of the average family.

BRIEF DESCRIPTION OF THE DRAWINGS

FIGURE 2 is a broken-out perspective view showing in greater detail a portion of the apparatus of FIGURE 1.

FIGURE 3 is an exploded, perspective view of the apparatus of FIGURE 1 adapted to perform conventional barbequing.

DESCRIPTION OF THE PREFERRED EMBODIMENTS

Figure 1:
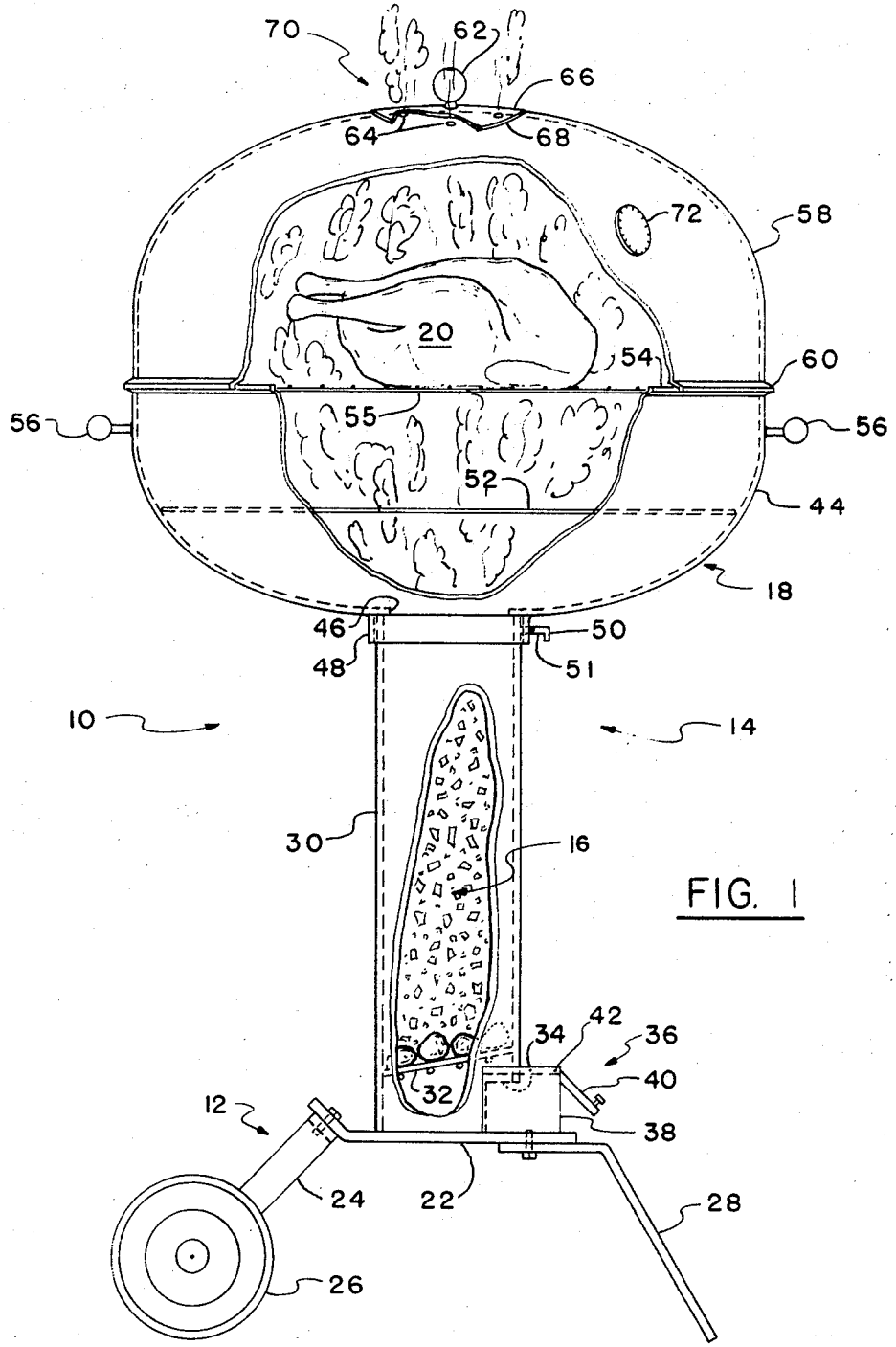
FIGURE 1 is a partially broken-out view of apparatus for preparing food in accordance with the invention.

Referring to the drawings and particularly FIGURES 1 and 2, a food preparation apparatus 10 of the invention, comprises supporting base means 12, means 14 for retaining fuel 16 and for directing a flow of air therethrough to regulate the rate of burning of the fuel, and sealable enclosure means 18 for supporting food which is to be prepared within a desired atmosphere, the food being depicted herein as a fowl 20. As is further described hereinafter, when a smoking process is to be performed the fuel 16 is retained within the fuel retaining means 14, but when a conventional barbequing process is to be performed the fuel is retained within the lower portion of the enclosure means 18.

Regarding the base means 12 there is provided a base plate 22, and a bar 24 is secured, as by bolting or welding, along one end thereof and is bent downwardly to define a pair of legs for rotatably supporting a pair of wheels 26. A support leg 28 is bolted or welded to the other end of the base plate 22, and extends downwardly therefrom to provide the third supporting leg for the apparatus 10. It is to be understood that any variety of legs and many configurations may be utilized for the base means 12 in place of the particular 3-point, 2-wheeled design shown herein for purposes of example only. In fact, the apparatus may be affixed to a rigid support permanently secured to the ground, to provide a nonmovable device.

Fuel retaining means 14 of previous mention, comprises a hollow tube 30 preferably formed of a thick walled steel tube, secured at one end to the top surface of the base plate 22, by welding or by securing tabs (not shown) to the lower end of the tube 30 and securing the tabs to the base plate 22. The latter arrangement provides means for readily disassembling the tube 30 from the plate 22 to facilitate cleaning and/or storing the apparatus. A fuel retaining grid 32 is secured within the lower end of the tube 30, and an arcuate portion of the tube immediately below one end of the grid 32 is removed to form an opening 34 through which air is supplied to the lower end of the tube 30.

A damper device 36 is formed of a generally rectangular piece of channel 38, machined at one end to define a circular arc which has a diameter equal to the outside diameter of the tube 30. The channel 38 is thus adapted to fit against the outside of the tube 30 in register with the opening 34, and is preferably integrally affixed thereto in generally sealed relation as by welding. The bottom edges of the channel 38 are preferably but not necessarily welded to the base plate 22.

The extended, open end of the channel 38 is provided with a damper 40, hinged as at 42, and having friction means (not shown) integral therewith for preventing the damper 40 from movement once it is set at a selected angle.

Although the tube 30 is shown with a circular cross-section, it could be formed of a square, oval, etc. hollow tube. Also a heat resistant window may be fitted into an opening in the wall of the tube, whereby the lower portion of the column of wood chips may be viewed to check the burning rate and to determine when more wood chips should be added.

Referring, in addition, to FIGURE 3, the food supporting enclosure means 18 comprises a lower, generally bowl-shaped receptacle 44 having a circular opening 46 formed in the bottom thereof, which opening 46 is slightly smaller than, or equal to, the internal diameter of the tube 30. A ring 48 having an inside diameter slightly larger than the outside diameter of the tube 30, is welded in coaxial relation to the bottom of the receptacle 44 to provide thus a connecting flange integral therewith for demountably securing the receptacle 44 to the top end of the tube 30. A set-screw 50 is disposed in a radial, threaded hole 51 in the ring 48. The top end of tube 30 bears against the bottom of the receptacle 44 to restrict the extent of entry of the tube. Although the enclosure means 18 is secured to the tube 30 via the ring 48 and setscrew 50, other fastening means may be used instead. The receptacle 44 may be detachably hinged to the tube 30, or may be secured thereto by means of radial prongs secured to the tube 30 and adapted to engage circumferential slots formed in the ring 48 much in the manner of an automobile taillight bulb.

The receptacle 44 is provided with a machined lip 54 along the rim thereof, which provides thus a sealing surface as well as a continuous ledge upon which a food supporting grill 55 is disposed. A pair of handles 56 are secured to the outer wall to facilitate removal of the receptacle 44, and general handling of the apparatus 10.

A domed cover 58 having a bowl-shape similar to that of the receptacle 44, is provided along its rim with a flanged lip 60 which is machined to fit over and mate with the lip 54 of the receptacle to provide the sealable enclosure means 18. Thus when the cover 58 is placed on the receptacle 44 a generally sealed fit is provided.

The top of the domed cover 58 is provided with a knob 62 to facilitate handling the cover. A series of holes 64 are provided in the cover 58 at equal radii from the center thereof, and a disk 66 having a matching series of holes 68 is rotatably secured to the cover 58. Rotation of the disk 66 through various positions allows varying the degree of register of the holes in the disk with the holes 64 in the cover to thus provide an adjustable vent means 70 which cooperates with the damper device 36 to regulate the passage of air through the tube 30 and thus the rate of burning of the fuel 16. The disk 66 may be secured to the knob 62 which in turn is rotatably secured to the cover 58, wherein the knob 62 is used for handling the cover 58, as well as for rotating the disk 66. A temperature gauge 72 is secured in the cover 58 to provide means for detecting the temperature within the enclosure means 18. The cover 58 as well as the receptacle 44 may be formed of cast iron, aluminum or other similar type of material.

In utilizing the apparatus 10 as a smoker, the enclosure means 18 is removed from its position on the tube 30 by loosening the setscrew 50, and a few charcoal briquets are placed on the fuel retaining grid 32 and are set afire by means of the usual flammable starter fluids. The wood chips, preferably of hardwoods such as hickory, are then poured into the tube 30 on top of the burning coals, and the enclosure means is returned to its position on the tube 30, and secured by means of setscrew 50. The food to be prepared is then placed on the grill 55 and the cover 58 is securely fitted to the receptacle 44. Then the hinged damper 40 is opened to a selected angle and the vent means 70 is adjusted, to provide the desired draft within the tube 30 for controlling the rate of burning of the wood chips to cause them to smolder rather than burn. It is found that one column of wood chips will smolder for several hours. If additional wood chips need to be added to extend the duration of the smoking process the enclosure 18 is removed as previously described, and the chips are simply poured into the tube 30 on top of those which are still burning. The smoking process is thus maintained continuous without the need for re-lighting. For this purpose and as best shown in FIGURE 1, tube 30 is formed with a length substantially greater than width, in this instance the width being the diameter of the tube.

When it is desired to prepare food by conventional barbequing methods, the present invention readily converts into a device suitable for that purpose. An annular ring 52 supports a grill 76 and is designed to rest in the lower porton of receptacle 44. The mesh of grill 76 is fine enough to support normal charcoal briquets and is provided precisely for that purpose.

Thus fuel, in the form of charcoal briquets or wood chips, may be placed on the grid 76, and lighted as in conventional barbeque pits, to provide a bed of hot coals immediately below the food supported on the grill 55. It is understood that a vertically spaced series of tabs or ledges (not shown) may be provided at spaced intervals around the inside of the receptacle 44, whereby the distance between the grid 76 and the grill 55 may be varied. Or a lever system (not shown) such as utilized in conventional circular barbeque pits may be utilized wherein the lever extends through the wall of the receptacle and pivots at that point, with the inside end of the lever coupled to the grid 76 or the annular ring 52, which is thus supported by the rod and lever rather than the wall of the receptacle 44, as herein depicted.

When utilizing the apparatus as a barbeque pit, charcoal briquets are placed on the grid 76 and are set on fire in the usual manner. However, by placing the cover 58 on the receptacle 44, the rate of burning of the briquets can be controlled by means of the damper device 36 and vent means 70, as is done when using the apparatus as a smoker. In fact, since the enclosure 18 can be sealed, the briquets may be readily saved for a subsequent barbeque without the need for soaking them in water, by closing the vent means 70, the damper device 36, and sealing the cover 58 to thus suffocate the fire.

I claim:
1. Apparatus for treatment and preparation of food comprising, in combination;
   supporting base means including a base plate;
   a hollow elongate pipe member secured at one end to said base plate and extending generally upright therefrom and having a length greater than width for retaining a column of woodchips to be burned at a slow rate for producing smoke;
   food supporting enclosure means attached to the upper end of said hollow member with the respective volumes thereof in communication; and
   adjustable vent means for varying the amount of air passing through said hollow member and thus regulating the smoke introduced to said food supporting enclosure means.

2. The apparatus of claim 1, wherein said food supporting enclosure means further comprises, a receptacle having an opening formed therein and detachably secured to said hollow pipe with said opening in register with said pipe, a food supporting grill supported by said receptacle, and a domed cover adapted to fit upon said receptacle to enclose therewithin the food in substantially sealed relation.

3. The apparatus of claim 2, wherein said adjustable vent means for varying the air includes an adjustable vent integrally formed in said domed cover to provide passage of a selected amount of air therefrom.

4. Apparatus for treatment and preparation of food comprising, in combination;
   supporting base means including a base plate;
   a hollow elongate pipe member secured at one end to said base plate and extending upright therefrom and having a length greater than width for retaining a column of woodchips to be burned at a slow rate for producing smoke;
   a food supporting enclosure having a receptacle formed with an opening therein and being detachably secured to the upper end of said hollow member with said opening in registration therewith and having a food supporting grill supported by said receptacle and a domed cover adapted to fit upon said receptacle to enclose therewithin the food in substantially sealed relation; and
   an adjustable vent integrally formed in said domed cover and a damper device coupled to the end of said hollow member and thus regulating the smoke introduced to said food supporting enclosure.

5. The apparatus of claim 4, further comprising a fuel retaining grid disposed within the bottom of said hollow pipe.

6. The apparatus of claim 4 further comprising a fuel retaining grid disposed within the receptacle a selected distance below said food supporting grill.

7. The apparatus of claim 4 wherein said receptacle further includes a fastening means integral therewith, and adapted to detachably secure said receptacle to said hollow pipe.

References Cited
UNITED STATES PATENTS

| | | | |
|---|---|---|---|
| 2,246,804 | 6/1941 | Lipschutz | 99—259 XR |
| 2,787,995 | 4/1957 | Alter | 126—25 |
| 2,842,043 | 7/1958 | Reuland | 99—259 |
| 2,894,448 | 7/1959 | Henderson et al. | 99—259 XR |
| 2,967,023 | 1/1961 | Huckabee | 99—259 XR |
| 3,139,023 | 6/1964 | Irwin | 99—260 |
| 3,172,402 | 3/1965 | Valiela | 126—25 |
| 3,279,452 | 10/1966 | Hottenroth et al. | 126—25 |
| 3,330,266 | 7/1967 | Stephen | 126—25 |
| 3,333,526 | 8/1967 | Kirkpatrick | 99—260 |

ROBERT W. JENKINS, Primary Examiner